| (12) | United States Patent | (10) Patent No.: | US 8,380,463 B2 |
| | Philipps | (45) Date of Patent: | Feb. 19, 2013 |

(54) APPARATUS HAVING A MODULARLY CONSTRUCTED, MEASURING TRANSDUCER CIRCUIT

(75) Inventor: Michael Philipps, Lörrach (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 632 days.

(21) Appl. No.: 12/312,583

(22) PCT Filed: Nov. 15, 2007

(86) PCT No.: PCT/EP2007/062395
§ 371 (c)(1),
(2), (4) Date: Feb. 2, 2010

(87) PCT Pub. No.: WO2008/059019
PCT Pub. Date: May 22, 2008

(65) Prior Publication Data
US 2010/0145481 A1    Jun. 10, 2010

(30) Foreign Application Priority Data

Nov. 16, 2006  (DE) .................. 10 2006 054 421
Dec. 6, 2006   (DE) .................. 20 2006 018 584 U (51) Int. Cl.
*G06F 15/00* (2006.01)
*G01R 15/00* (2006.01)
(52) U.S. Cl. .............. 702/189; 250/231.13; 702/57; 702/130
(58) Field of Classification Search .......... 702/22, 702/30–33, 46–47, 52, 57, 60, 64, 66, 75, 702/78, 79, 81, 84, 98, 99, 104, 106, 121, 702/189, 130; 250/231.13
See application file for complete search history.

(56) References Cited

U.S. PATENT DOCUMENTS

| 6,285,964 | B1 * | 9/2001 | Babel et al. .................. 702/121 |
| 7,256,391 | B2 * | 8/2007 | Kuroda et al. ........... 250/231.13 |
| 2006/0170410 | A1 | 8/2006 | Bjorn | |

FOREIGN PATENT DOCUMENTS

| DE | 197 55 516 A1 | 6/1999 |
| DE | 203 07 308 U1 | 8/2003 |
| DE | 10 2004 049 771 A1 | 4/2006 |
| DE | 10 2004 052 490 A1 | 7/2006 |
| EP | 1 901 145 A2 | 3/2008 |
| JP | 10253392 A | 9/1998 |

* cited by examiner

*Primary Examiner* — John H Le
(74) *Attorney, Agent, or Firm* — Bacon & Thomas, PLLC (57) ABSTRACT

An apparatus having at least one sensor for registering at least one chemical and/or physical, process variable, and at least one modularly constructed, measuring transducer circuit, which has at least one sensor unit, which ascertains a measured variable from the process variable registered by the sensor and supplies the sensor with energy as needed, and at least one application specific, signal processing unit for ascertaining a measured value of the measured variable, wherein a conditioned output signal is provided between the sensor unit and the application specific, signal processing unit, wherein the application specific, signal processing unit is exchangeably embodied, and wherein, as a function of a predeterminable accuracy of measurement with which the apparatus ascertains the measured values, a plurality of different types of application specific, signal processing units are provided.

22 Claims, 4 Drawing Sheets

APPARATUS HAVING A MODULARLY CONSTRUCTED, MEASURING TRANSDUCER CIRCUIT

TECHNICAL FIELD

The invention relates to an apparatus having a modularly constructed, measuring transducer circuit.

BACKGROUND DISCUSSION

In industrial measurements technology, especially in automation, and process control, technology, regularly applied are apparatuses, which, in the running of a process, measure process variables by means of sensors or adjust control variables by means of actuators. Such apparatuses ascertain, for example, pressure, flow, e.g. flow rate, fill level, dielectric constant, interface locations, temperature or some other physical and/or chemical process quantity as a process variable in the running of a process. Available from the assignee are, for example, such apparatuses in the form of field devices under the marks, Cerabar, Deltabar, Deltapilot, Promass, Levelflex, Micropilot, Prosonic, Soliphant, Liquiphant, Easytemp, which serve primarily to determine and/or to monitor at least one of the above referred to, process variables of a medium in a container.

A commonality of all of the above mentioned apparatuses, or field devices, is that, from the process variables registered by the sensors, a measured value is ascertained and evaluated by means of an electronics connected after the sensor. This electronics is, most often, so matched to the corresponding measuring requirements and to the process variable to be measured, that, for each sensor principle, for each process variable to be measured, and for each type of measuring performance, a special electronics must be developed. The signal processing function near to the sensor is, most often, embodied as an ASIC (Application Specific Integrated Circuit), which often is produced in large piece numbers. Another solution is to provide field devices with different measurement accuracy standards, a uniform electronics and maximum measuring performance and to activate or deactivate particular functionalities e.g. per software.

Disadvantageous in these electronics is that the costs for the electronics are often not proportional to the required measuring performance and no modularity is provided.

SUMMARY OF THE INVENTION

An object of the invention is to provide an apparatus, whose measuring performance and functionality can be easily matched to requirements and which can be put into practice cost effectively.

This object is achieved according to the invention by an apparatus including at least one sensor for registering at least one chemical and/or physical, process variable and at least one modularly constructed, measuring transducer circuit, which includes at least one sensor unit, which, from the process variable registered by the sensor, ascertains an electrical, measured variable and which supplies the sensor with energy as needed, and at least one application specific, signal processing unit for ascertaining a measured value from the electrical, measured variable, wherein transmission of a conditioned output signal between the sensor unit and the application specific, signal processing unit is provided, wherein the application specific, signal processing unit is exchangeably embodied, and wherein, as a function of a predeterminable accuracy of measurement of the measured value, at least one of a plurality of different types of application specific, signal processing units is installable.

In the case of a preferred embodiment of the apparatus of the invention, there is connected after the signal processing unit a control/evaluation unit, which provides for evaluation and further processing of the measured value, as well as for control (closed and/or open loop) of the apparatus.

An advantageous form of embodiment of the apparatus of the invention provides that a first type of the application specific, signal processing unit is provided for applications having a low requirement for accuracy of measurement.

Another advantageous embodiment of the apparatus of the invention provides a second type of the application specific, signal processing unit for applications having an average requirement for accuracy of measurement.

In an additional, advantageous embodiment of the apparatus of the invention, a third type of the application specific, signal processing unit is provided for applications having a high requirement for accuracy of measurement.

In the case of an additional, preferred form of embodiment of the apparatus of the invention, the first type of the application specific, signal processing unit includes at least one lowpass circuit.

Another preferred form of embodiment of the apparatus of the invention provides, that the lowpass circuit provides, in the form of an analog electrical current signal or an analog voltage signal, a measured value proportional to the electrical, measured variable.

A supplementing form of embodiment of the apparatus of the invention permits, that the second type of the application specific, signal processing unit includes at least one counting circuit.

In the case of a further preferred form of embodiment of the apparatus of the invention, the third type of the application specific, signal processing unit includes at least one analog/digital converter circuit.

Other preferred forms of embodiment of the apparatus of the invention include, that the counting circuit and/or the analog/digital converter circuit provide, in the form of a digital signal, a measured value proportional to the electrical, measured variable.

In another preferred form of embodiment of the apparatus of the invention, at least the first type, the second type and/or the third type of the application specific, signal processing unit is integrated fixedly into the measuring transducer circuit.

An embodiment of the apparatus of the invention provides, additionally, that in the measuring transducer circuit at least one plug-in location is provided for modular exchanging of the different types of the application specific, signal processing unit.

In the case of an additional form of embodiment of the invention, a switch element is provided at the plug-in location.

Another preferred form of embodiment of the invention provides a review unit, which enables a plausibility review or validation of the measured values ascertained by the first type, second type or third type of the application specific, signal processing unit provided in the plug-in location with the measured values ascertained by the first type, second type or third type of the application specific, signal processing unit integrated fixedly in the measuring transducer circuit.

In an advantageous form of embodiment of the apparatus of the invention, it is provided, that there is at least one hardwired connection for transmission of the uniformly modulated output signal between the sensor unit and the application specific, signal processing unit.

An advantageous form of embodiment of the apparatus of the invention is that in which at least one isolating element is provided for galvanic isolation of the hardwired connection.

An alternative advantageous embodiment of the apparatus of the invention provides that a wireless connection is provided for transmission of energy, data and the uniformly modulated output signal between the uniform sensor unit and the application specific, signal processing unit.

In an additional preferred form of embodiment of the apparatus of the invention, a shared clocking line or a preamble in the uniformly modulated output signal is provided for synchronization e.g. of the clocking frequency, the application specific, signal processing unit and the sensor unit.

In an advantageous form of embodiment of the apparatus of the invention, at least one light waveguide is provided for transmission of energy, data and the uniformly modulated output signal between the uniform sensor unit and the application specific, signal processing unit.

A preferred embodiment of the apparatus provides, especially, that setting parameters for supplying different types of sensors and/or for evaluation of the electrical, measured variable of different types of sensors are stored in the sensor unit.

In the case of a preferred embodiment of the apparatus of the invention, provided in the sensor unit is an automation routine for adjusting setting parameters corresponding to the ascertained type of connected sensor.

In the case of an additional preferred embodiment of the apparatus of the invention, a parametering unit provides for transmission to the sensor unit of data at least for adjusting the setting parameters and/or data for adjusting the conditioning of the uniformly conditioned output signal.

In the case of an additional preferred form of embodiment of the apparatus of the invention, a pulse width modulated signal is provided as uniformly conditioned output signal.

Other preferred forms of embodiment of the apparatus of the invention provide, that a frequency modulated signal is provided as uniformly conditioned output signal.

A supplementing form of embodiment of the apparatus of the invention permits, that a pulse phase modulated signal is provided as uniformly conditioned output signal.

Other preferred forms of embodiment of the apparatus of the invention include, that the sensors are embodied as NTC thermistor, PTC thermistor, semiconductor temperature sensor, thermocouple, pyroelectric temperature sensor, Curie effect, temperature sensor and/or fiber optical, temperature sensor for ascertaining a temperature as electrical, measured quantity of the process variable.

In another preferred form of embodiment of the apparatus of the invention, sensors are provided, which, according to a capacitive, piezoresistive, optical or fiber optical principle of action, convert the process variable, pressure, into a proportional electrical, measured variable, for ascertaining a pressure as electrical, measured quantity of the process variable.

An embodiment of the apparatus of the invention provides that sensors, which work according to a capacitive, conductive, piezoelectric measuring principle or travel time measuring principle, are provided for ascertaining a fill level or a limit level in a container as electrical, measured quantity of the process variable.

An embodiment of the apparatus of the invention provides sensors, which work according to a magneto-inductive measuring principle, Coriolis, vortex counting or travel time measuring principle or Venturi, orifice plate, or stagnation pressure probe principle, for ascertaining a flow as electrical, measured quantity of the process variable.

The aforementioned, as well as claimed, components, and components described in the examples of embodiments, used according to the invention, are subject to no special conditions as regards their size, shape, formation, materials and technical designs, so that selection criteria known in the field of application can be used without limitation.

BRIEF DESCRIPTION OF THE DRAWINGS

Other details, features and advantages of the subject matter of the invention will become evident from the subsequent description of the associated drawings, in which preferred examples of embodiments of the invention are presented. In the examples of embodiments of the invention shown in the figures, in order to avoid clutter and for simplification, components or assemblies of components, which correspond in construction and/or in function, are provided with equal reference characters. The figures of the drawings show as follows.

DETAILED DISCUSSION IN CONJUNCTION WITH THE DRAWINGS

Figure 1:
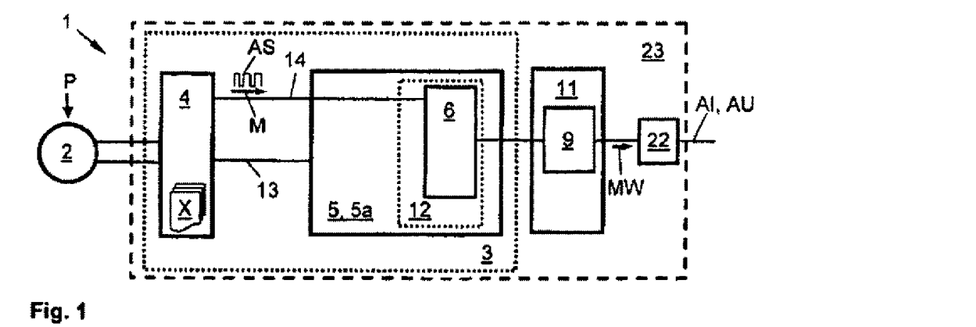
FIG. 1 a first example of an embodiment of an apparatus of the invention, including a modularly constructed, measuring transducer circuit.

The invention resides in equipping a measuring transducer circuit 3 with correspondingly prefabricated components, such as e.g. a uniform sensor unit 4, a control/evaluation unit 11, an energy supply unit and a communication interface 22, and, depending on measuring performance, or desired accuracy of measurement of the measured value MV of the process variable P, modularly installing at least a first type 5a, a second type 5b and/or a third type 5c of the application specific, signal processing unit 5. The modularly embodied, measuring transducer circuit 3 of the invention is, for example, such as shown in FIG. 1, integrated in a measurement transmitter 23. On the other hand, it is possible to install the measuring transducer circuit 3 with the sensor 2 directly in a device or plant, without integration in a measurement transmitter 23. The measuring transducer circuit 3 of the invention converts the electrical, measured variables M of connected sensors 2 into a measured value MV represented by a proportional, analog or digital, measurement signal. A sensor 2, or measuring gage, is a technical element, which quantitatively ascertains certain physical or chemical, process variables, such as e.g. fill level, flow, pressure, pH-value, temperature, moisture, conductivity as electrical, measured variable M. These process variables P are registered by the sensors 2 by means of physical or chemical effects and transduced into a proportional, further processable, electrical, measured variable M. The signal processing unit 5 includes, for example, also a signal conditioning unit, which appropriately linearizes, amplifies, scales and/or calibrates the ascertained measurement signal.

FIG. 1 shows a first example of an embodiment of an apparatus 1 of the invention, including a measurement transmitter 23 and a sensor 2. The apparatus 1 is generally also referred to as a field device or sensor system. Provided in the measurement transmitter 23 is a modularly embodied, measuring transducer circuit 3, which is constructed at least of a uniform sensor unit 4 and a first type 5a of the application specific, signal processing unit 5. The first type 5a of the application specific, signal processing unit 5 is for applications having a low requirement for accuracy of measurement of the measured values MV of the process variable P ascertained with the apparatus 1. The term "accuracy of measurement" refers in measurements technology to the degree of agreement between the ascertained measured value MV and the absolute, actual value of the measured value MV. As indicated in FIG. 1, a control/evaluation unit 11 and a communication interface 22 can be integrated in the measurement transmitter 23. Connected to the measurement transmitter 23 is at least one sensor 2, which ascertains a process variable P in a process. The process variables P in a process are here, for example, process dependent, physical variables, such as e.g. pressure, fill level, flow, temperature, and medium dependent, physical variables, such as e.g. density, conductivity of the medium. This process variable P registered by the sensor 2 is registered by the sensor unit 4 and, on the basis of the sensor unit 4 as adjusted by the present setting parameters X, converted into an electrical, measured variable M. In the setting parameters X, it is specified for the sensor unit 4, how to register the process variable P of the sensor 2 and how to convert it into a modulated output signal OS corresponding to the electrical, measured variable M. The sensor unit 4 is so embodied, that each electrical, measured variable M is transmitted as an appropriately conditioned, modulated output signal OS to the application specific, evaluation unit 5. The sensor unit 4 is so set via the setting parameters X, that, depending on level of the ascertained electrical, measured variable M, a proportional, modulated output signal OS is transmitted via a hardwired connection 14. Applied as conditioned, modulated output signal OS can be, for example, a pulse width modulated, frequency modulated, pulse phase modulated, electrical current, voltage, optical or electromagnetic signal. The first type 5a of the application specific, signal processing unit 5 shown in FIG. 1 is, for example, in the simplest case, embodied as a lowpass (lowpass filter) 6, which produces, from the transmitted modulated output signal OS, e.g. pulse width modulated signal, a corresponding, averaged, equally shaped electrical current or voltage value. This lowpass 6 is embodied as a module, which can be integrated in the measuring transducer circuit 3 via a plug-in location 12.

A signal converter 9 transforms the averaged output signal OS smoothed by the lowpass 6 into a corresponding analog electrical current signal AI or an analog voltage signal AU and/or adapts the size association of the smoothed, averaged output signal OS to the analog electrical current signal AI, or voltage signal AU. This signal converter 9 is, for example, integrated in the control/evaluation unit 11; however, it can also be integrated in the module of the application specific, signal processing unit 5 of the first type 5a.

The analog electrical current signals AI, or voltage signals AU, are then forwarded either directly to other electronic units in devices, such as e.g. in the OEM domain (Original Equipment Manufacturer), or via a communication interface 22 of the apparatus 1 of the invention to other field devices or to a control station 30. The term "OEM producer" refers to a manufacturer, which manufactures self-produced components and/or products for device, or plant, builders.

Figure 1A:
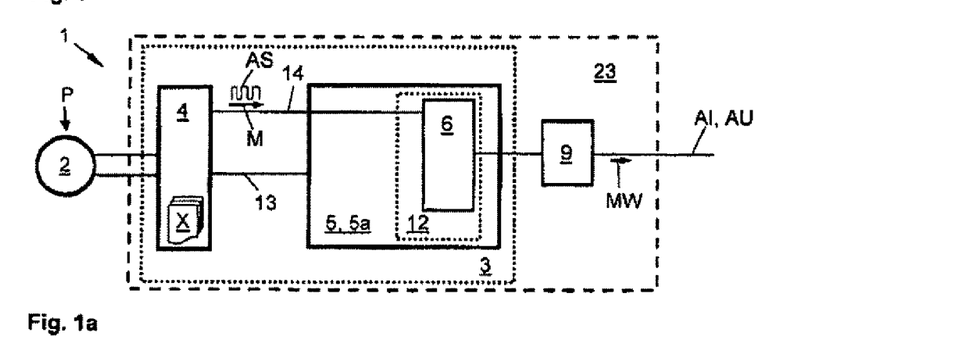
FIG. 1a a further first example of an embodiment of an apparatus of the invention, including a modularly constructed, measuring transducer circuit for OEM-products.

FIG. 1a shows a further first example of an embodiment of an apparatus 1 of the invention, with a modularly constructed, measuring transducer circuit 3 and a sensor 2. This embodiment of the apparatus 1 is so constructed, that the measuring transducer circuit 3, in contrast with the measuring transducer circuit 3 of FIG. 1, includes no control/evaluation unit 11 and communication interface 22. In the case of this example of an embodiment, the apparatus 1 is directly integrated into a superordinated measuring system or device e.g. in the OEM domain, and the measured value MV is output by the signal converter 9 as a scaled, analog electrical current signal AI or analog voltage signal AU.

Figure 2:
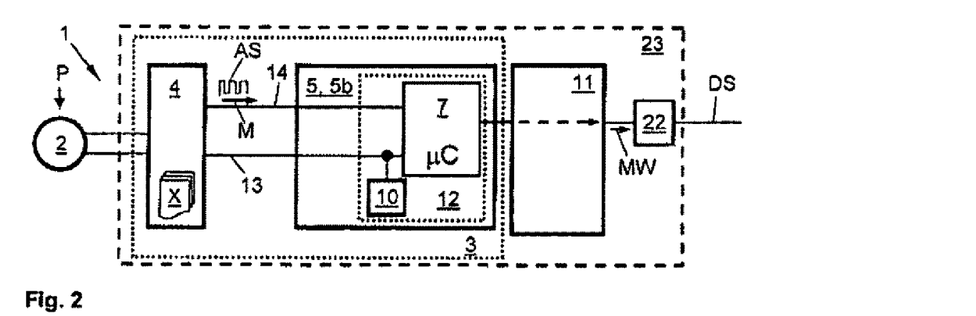
FIG. 2 a second example of an embodiment of an apparatus of the invention, including a modularly constructed, measuring transducer circuit.

FIG. 2 shows a second example of an embodiment of an apparatus 1 of the invention, with a modularly constructed, measuring transducer circuit 3 and a sensor 2. The modularly embodied, measuring transducer circuit 3 is constructed at least of a uniform sensor unit 4 and a second type 5b of the application specific, signal processing unit 5 for an application with an average requirement for accuracy of measurement. This second type 5b of application specific, signal processing unit 5 is, for example, embodied as a counting circuit 7, which correspondingly samples the conditioned output signal OS. The counting circuit 7 is embodied, for example, as a microcontroller for signal processing. The counting circuit 7 samples the modulated output signal OS by means of sampling pulses and ascertains therefrom a value corresponding to the electrical, measured variable M and the process variable P. For synchronization of the producing of the correspondingly modulated output signal OS in the sensor unit 4, which is embodied as a signal conditioner, and for evaluation of the correspondingly modulated output signals, an equal clock signal is provided. For this, for example, there is integrated in the signal processing unit 5 a clock signal producer 10, which supplies via a clocking line 13 the sensor unit 4 and the signal processing unit 5 with the same clock signal. The digitized value ascertained from the sampled output signal OS is forwarded to a control/evaluation unit 11, which generates therefrom, by means of further signal processing and evaluating algorithms, a measured value MV. This measured value MV of the apparatus 1 of the invention is sent via a communication interface 22, for example, as digital signal DS on the fieldbus 33 or as an analog communication signal according to the 4 mA and 20 mA electrical current loop standard on a two wire line 33 to other electronic units, field devices or a control station 30.

Figure 3:
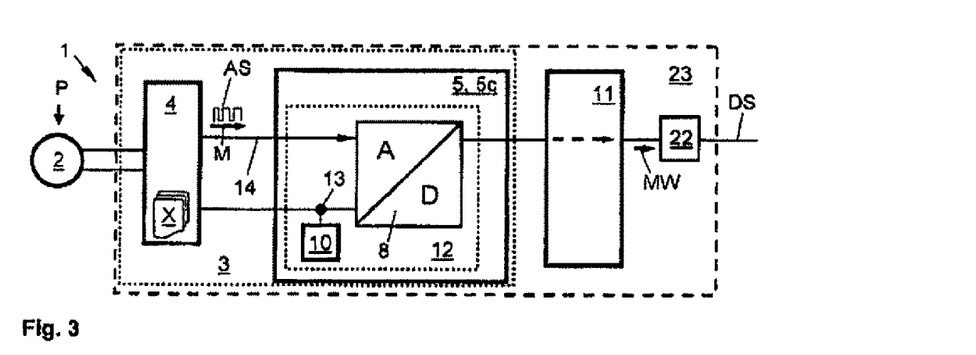
FIG. 3 a third example of an embodiment of an apparatus of the invention, including a modularly constructed, measuring transducer circuit.

FIG. 3 shows a third example of an embodiment of an apparatus 1 of the invention, with a modularly constructed, measuring transducer circuit 3 and a sensor 2. The modularly embodied measuring transducer circuit 3 is constructed at least of a uniform sensor unit 4 and a third type 5c of the application specific, signal processing unit 5 for an application with a high requirement for accuracy of measurement. For this, there was installed in the plug-in location 12 an analog/digital converter circuit 8, which enables, rapidly and highly accurately, ascertaining of an exact measured value MV of the process variable P from an electrical, measured variable M provided in the uniformly, modulated output signal OS. There are a plurality of analog/digital converter circuits 8, which all can be applied in the apparatus 1 of the invention as a third type 5c of the application specific, signal processing unit 5 in the modularly constructed, measuring transducer circuit 3. An A/D converter circuit applicable in the apparatus of the invention is described, for example, in EP 0 237 583 B1.

Figure 4:
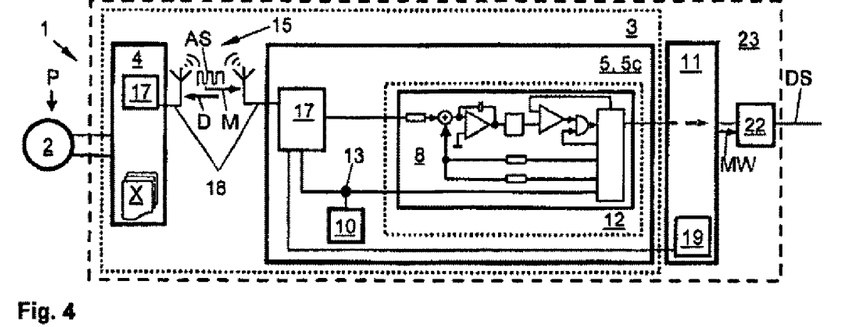
FIG. 4 a fourth example of an embodiment of an apparatus of the invention, including a modularly constructed, measuring transducer circuit.
Figure 5:
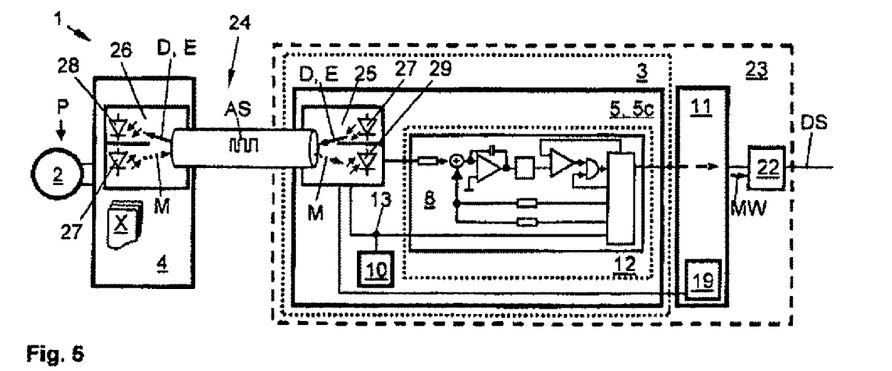
FIG. 5 a fifth example of an embodiment of an apparatus of the invention, including a modularly constructed, measuring transducer circuit.

In the process measurements technology, at times, a galvanic isolation is specified, since the process space or the elements in contact with the process must be placed at ground, or earth, potential on the basis of the requirements of explosion protection. The circuit grounds of the apparatus 1 of the invention, or the field devices, deviate, however, most often, from ground, or earth, potential. The difference between the two potentials results in a voltage between the grounded process elements and the apparatus 1, whereby an electrical current is caused to flow. This electrical current has the disadvantage, that the lines of the circuit ground are loaded supplementally by the electrical current flow. This can lead to storage of energy, so that the ignition protection type "intrinsic safety" of the field device, or the apparatus 1, is no longer assured. In FIGS. 4 and 5, two examples for galvanic isolation of the communication connection between the sensor unit 4 and the signal processing unit 5 are disclosed.

FIG. 4 shows a fourth example of an embodiment of an apparatus 1 of the invention, with a modularly constructed, measuring transducer circuit 3. In this case, communication of the electrical, measured variable M and data D between the sensor unit 4 and the application specific, signal processing unit 5 occurs via a wireless connection 15. As application specific, signal processing unit 5 in the examples of embodiments in FIGS. 4 and 5, a special analog/digital converter circuit 8 is provided, which enables a fast and highly accurate ascertaining of the measured value of the process variable. Construction and operation of this special analog/digital converter circuit 8 is available, for example, in EP 0 237 583 B1 and is here not discussed further at length. The wireless connection 15 is, above all things, of advantage, when the energy supply and the communication between sensor unit 4 and signal processing unit 5 occurs by means of an RFID-transponder technology. In such case, the sensor unit 4 with the sensor 2 functions as transponder, which can be read from by the signal processing unit 5 as reading device. The data transmission between the transponder and reading device takes place, in the normal case, by means of electromagnetic waves. At low frequencies, this is effected by an inductive, near field coupling and, at higher frequencies, by an electromagnetic, far field coupling. Integrated in the sensor unit 4 and the signal processing unit 5 as wireless communication elements are a transmitting/receiving unit 17 and a transmitting element 18, e.g. in the form of an antenna or coil. This example of an embodiment is especially interesting in the case of sensors 2, which themselves consume energy scarcely or consume little energy. Moreover, integrated in active RFID-transponders, most often, is a small, chargeable energy storer. The synchronization of the clocking in the sensor unit 4 and the signal processing unit 5 occurs in this form of embodiment of the invention by, at the beginning of the fetching of the electrical, measured variable M of the sensor unit 4 by the signal processing unit 5, transferring to the sensor unit 4 required energy, e.g. possibly for charging the energy storage unit, and the clock signal. In this case, a number of sensors 2 can be operated at a signal processing unit 5. For distinguishing the different sensors 2, in this case, an identification must be stored e.g. in the setting parameters X of the sensor unit 4. The feeding of the data D, e.g. the setting parameters X, into the sensor unit 4 and/or for adjusting the conditioning of the uniformly conditioned output signal OS, occurs via a parametering unit 19, which, for example, is associated with the control/evaluation unit 11. When the parametering unit 19 would like to transmit data D to the sensor unit 4, the parametering unit 19 signals the transmission ready state to the sensor unit 4 by transmitting a signaling signal by means of the sending/receiving units 17 and the transmitting elements 18 via the wireless connection 15 to the sensor unit 4. Following the signaling signal, the sensor unit 4 switches into a receiving mode, in which the setting parameters X are transferred from the parametering unit 19, and the transmission of the electrical, measured variable M as conditioned output signal OS is paused for the time of the transmission.

FIG. 5 shows a further, fifth example of an embodiment for galvanic isolation between the sensor unit 4 and the application specific, signal processing unit 5. Applied in this example of an embodiment as transmission medium between the sensor unit 4 and the application specific, signal processing unit 5 is a light waveguide 24. Via this light waveguide 24, the sensor unit 4 is, in case required, supplied with the required energy E, as well as, simultaneously, the data D and the conditioned output signal OS are bidirectionally transferred between the sensor unit 4 and the application specific, evaluation unit 5. Applied as light waveguide 24 are known types, such as, for example, multimode or monomode, glass fibers. In the application specific, signal processing unit 5, for the in, and out, coupling of the optical signals, there are provided, in the light waveguide 24, a first optical transmitter/receiver unit 25 and, in the sensor unit 4, a second optical transmitter/receiver unit 26. The second optical transmitter/receiver unit 26 is composed, at least, of, for example, a photovoltaic element 28, for changing the optical energy signal E transmitted from the application specific, evaluation unit 5 into an electrical power, and a light emitting element 27, for producing the measured variable M as an optic, conditioned, output signal OS. Applied as photovoltaic element 28 can be, for example, concentrated solar cells or multilayer solar cells. Additionally for photovoltaic element 28, there can be integrated as receiver element in the sensor unit 4 a photosensitive element 29, which receives the data D transmitted from the application specific, evaluation unit 5. This additional, photosensitive element 29 is not explicitly shown in the figures and can also be omitted, in case the data signal D can be signal-technically distinguished and isolated from the energy signal E by means of the photovoltaic element 28. The photovoltaic element 28 transduces, in this case, the energy signal E into a corresponding electrical energy; simultaneously the photovoltaic element 28 receives the optical data signal D and transduces this into an electrical data signal D. On the other end of the light waveguide 24 in the measuring transducer circuit 3, a first optical transmitter/receiver unit 25 composed of at least one light emitting element 27 and a photosensitive element 29 is provided. Applied as light emitting element 27 is, for example, a light-emitting diode or a laser diode and as photosensitive element 29, for example, a photodiode or a phototransistor. For signal isolation of the energy signal E, the data signal D and the conditioned output signal OS from one another, the individual signals are transmitted in different radiation spectra. Through optical filters before the receivers, the corresponding spectral parts in the transmitted light signal can be filtered out and, thus, the individual signals, such as e.g. data signal D, energy signal E and conditioned output signal OS, can be signal-technically isolated. Furthermore, there is the opportunity to isolate the signals D, E, OS from one another through types of modulation. The energy signal E is, for example, produced in the first optical transmitter/receiver unit 25 by a laser diode, which, for example, radiates a continuous light in the infrared region, and, in the second optical transmitter/receiver unit 26, the energy signal E of the photovoltaic element 28 is converted back into an electrical energy. This converted, electrical energy is utilized for energy supply of the sensor unit 4 and the sensor 2. The sensor unit 4 is in this fifth example of an embodiment not integrated in the measuring transducer circuit 3 and the measurement transmitter 23. In this way, it is possible to install the sensor unit 4 with the sensor 2 at a more remote site and isolated from the measurement transmitter 23. This separated embodiment of the measuring transducer circuit 3 and the sensor unit 4 can also be used for the additional examples of embodiments in the other figures. The clock synchronization occurs such as set forth in the example of an embodiment in FIG. 3, however, by means of an optically transmitted clock signal.

Figure 6:
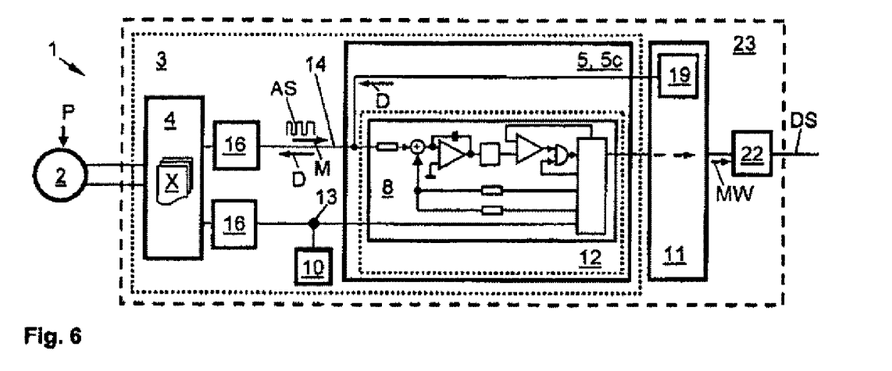
FIG. 6 a sixth example of an embodiment of an apparatus of the invention, including a modularly constructed, measuring transducer circuit.

A supplementing example of an embodiment for galvanic isolation between the sensor unit 4 and the application specific, signal processing unit 5 is disclosed in FIG. 6, in the case of which the communication of the electrical, measured variable M and the data D occurs via a hardwired connection 14 with isolating elements 16 for galvanic isolation. Examples of embodiments for such galvanic isolating elements 16 are opto-couplers, transformers or coupling structures for electromagnetic or capacitive coupling of a high-frequency transmission signal. In this example of an embodiment, the clock signal producer 10 is fixedly integrated in the construction of the measuring transducer circuit 3 and/or the measurement transmitter 23.

Figure 7:
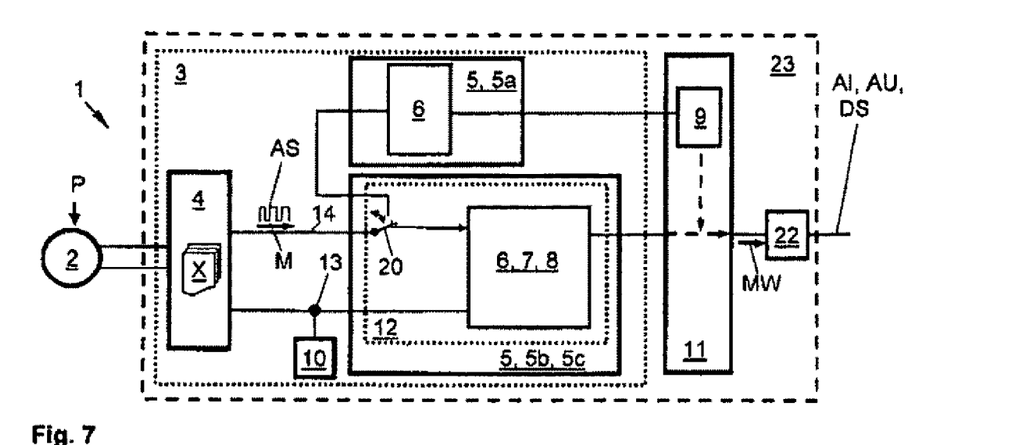
FIG. 7 a seventh example of an embodiment of an apparatus of the invention, including a modularly constructed, measuring transducer circuit.

FIG. 7 shows a seventh example of an embodiment of an apparatus 1 of the invention, with a modularly constructed, measuring transducer circuit 3 and a sensor 2. In this example of an embodiment, a signal processing unit 5 of the first type 5a with a low requirement for accuracy of measurement is integrated fixedly in the measuring transducer circuit 3 and/or in the measurement transmitter 23. If, in contrast, a higher requirement for accuracy of measurement, with which measured value MV of the process variable P is ascertained, is required, then a signal processing unit 5 with a higher accuracy of measurement can be installed in the plug-in location. If, in the plug-in location 12, another signal processing unit 5, e.g. the third type 5c with an analog/digital converter circuit 8, is installed, then a switch element 20 switches the connecting line 14 on the signal processing unit 5 in the plug-in location 12. The switch element 20 is associated with the plug-in location 12 and is triggered by the insertion of a signal processing unit 5 of the second type 5b or the third type 5c into the plug-in location. In the standard embodiment, thus, no signal processing unit 5 is integrated in the plug-in location 12. If, however, a higher measuring performance is required, then the appropriate retrofit set can be installed, in the form of a signal processing unit 5 of the second type 5b or the third type 5c, into the plug-in location 12.

Figure 8:
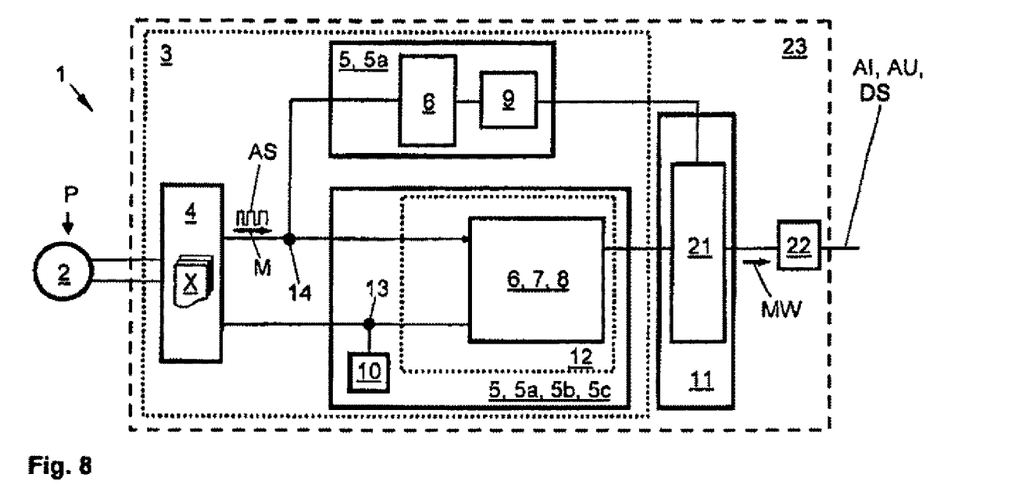
FIG. 8 a eighth example of an embodiment of an apparatus of the invention, including a modularly constructed, measuring transducer circuit.

FIG. 8 shows an eighth example of an embodiment of an apparatus 1 of the invention, with a modularly constructed, measuring transducer circuit 3 and a sensor 2. Additionally to the first type 5a of a signal processing unit 5 integrated fixedly in the measuring transducer circuit 3 and/or fixedly in the measurement transmitter 23, another signal processing unit 5 of the first type 5a, the second type 5b or the third type 5c is installed modularly in the plug-in location 12. The two measured values MV of these two signal processing units 5 are validated and verified in a review unit 21, which is provided, for example, in the evaluation unit 11. The review unit 21 conducts, for this, a plausibility review, or validation, of the individual measured values MV relative to one another, as made possible by the measured values MV ascertained by the first type 5a, second type 5b or third type 5c of the application specific, signal processing unit 5 provided in the plug-in location 12 compared with the measured values MV ascertained by the first type 5a of the application specific, signal processing unit 5 integrated fixedly in the measuring transducer circuit 3 and/or fixedly in the measurement transmitter 23. Furthermore, it is possible, through direct comparison of the measured values MV of a shared process variable P, as ascertained by means of different types 5a, 5b, 5c of the signal processing unit 5, to lessen the measurement error and/or measurement uncertainty of the total measuring of the apparatus 1 of the invention and, thus, to increase the availability. Through this example of an embodiment, it is possible to check or also to calibrate the ascertaining of the measured values MV of the process variable P by means of the first type 5a of signal processing unit 5 integrated fixedly in the measuring transducer circuit 3 and/or in the measurement transmitter 23 through the short-time use of a signal processing unit 5 of the second type 5b or the third type 5c in the plug-in location 12. Thus, cost-effective field devices, or apparatuses 1 with a smaller requirement for accuracy of measurement, can, for example, in the calibration phase in the production, be calibrated and checked through the use of a signal processing unit 5 of the second type 5b or the third type 5c. This functionality of the reviewing of the measured value MV of the process variable P of the fixedly installed signal processing unit 5 is also of use, when a service technician has to check the functionality and accuracy of measurement of the field device, or the apparatus 1. An embodiment of the second type 5b or the third type 5c can, as well, serve as the fixedly integrated, signal processing unit.

Figure 9:
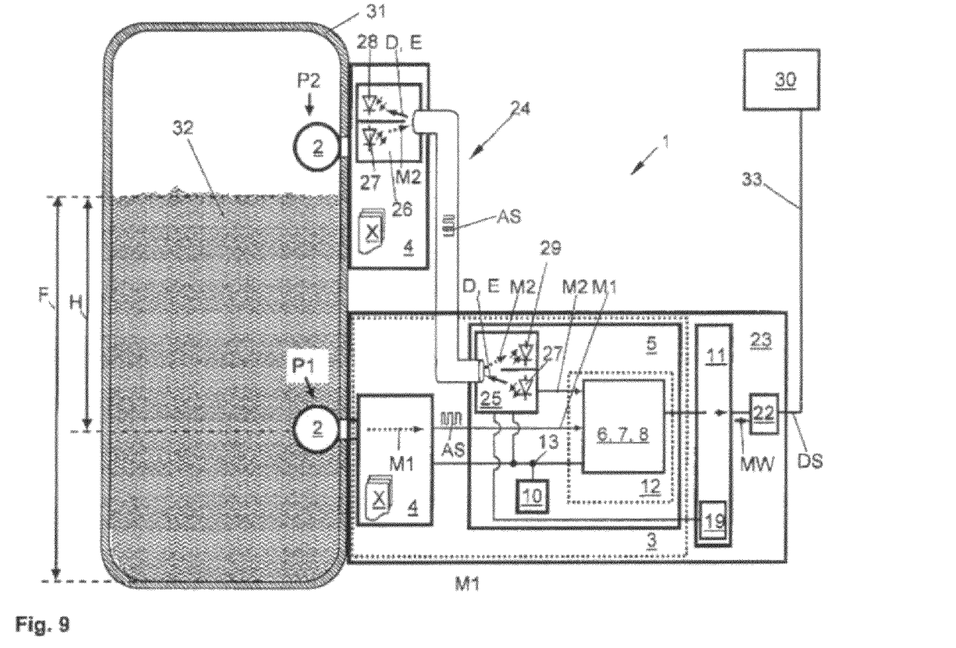
FIG. 9 a first example of an application of the fifth example of an embodiment of the apparatus of the invention in a distributed, process measurement system.
Figure 10:
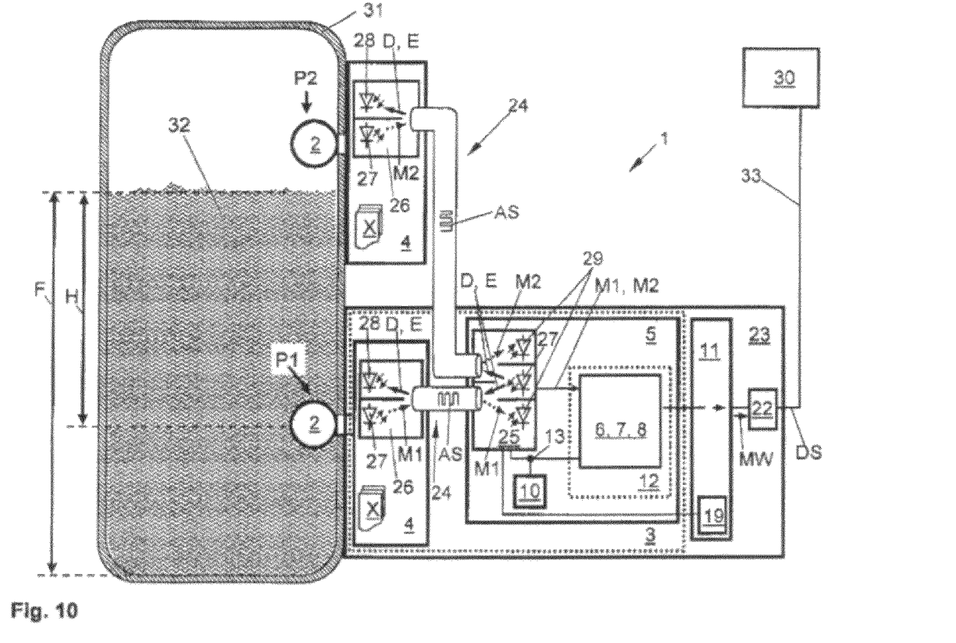
FIG. 10 a second example of an application of the fifth example of an embodiment of the apparatus of the invention in a distributed, process measurement system.

FIGS. 9 and 10 show first and second examples of an application of the fifth example of an embodiment as in FIG. 5, wherein an apparatus 1 for ascertaining the fill level F of a fill substance 32 in a container 31 according to the hydrostatic pressure measurement principle is applied. In the case of this measuring principle, there is installed above the maximum possible fill level F a second pressure sensor 2 for determining the second measured variable M2 of the headspace pressure as second process variable P2 and, below the minimum possible fill level F, a first pressure sensor 2 for determining the first measured variable M1 as first process variable P1. When the density of the fill substance does not fluctuate, this pressure difference can be used, taking into consideration the force of gravity, to ascertain a height H of the interface of the fill substance between the first and second pressure-sensor 2. For measuring the measured variable M, pressure difference, pressure difference transducers are applied in a number of applications. Besides the measured variable M, pressure difference, as such, also a fill level in a container is ascertainable with a pressure difference transducer on the basis of a hydrostatic pressure difference. As well, however, also a flow can be ascertained as measured variable M from the stagnation pressure difference between two different locations of different cross section in a horizontally arranged flume or before and after a constriction e.g. through a diaphragm plate or stagnation pressure probes.

Usually, the apparatus 1 is embodied for ascertaining the hydrostatic pressure difference in such a manner, that, at the position below the smallest fill level F, a pressure difference transducer is emplaced on the container 31 and the headspace pressure is fed via a capillary to the pressure difference transducer. Due to temperature influences on the capillary, the accuracy of measurement of the measuring can be negatively influenced. Furthermore, it is known from DE 694 33 185 T2 to ascertain the pressure difference by means of two individual pressure-transmitters, which are connected, in each case, via an electrical line with a measurement transmitter for ascertaining the pressure difference.

The example of an embodiment in FIG. 9 shows a first variant of the apparatus 1 for ascertaining the hydrostatic pressure difference, wherein, below the position of the smallest fill level F, a measurement transmitter 23 of the invention with a pressure-sensor 2 is placed on the container 31. The measuring transducer circuit 3 in the measurement transmitter 23 contains, supplementally, a first optical transmitting/receiving unit 25, via which, by means of a light waveguide 24, a further pressure-sensor can be connected, supplied and used for measuring the headspace pressure.

In the first optical transmitting/receiving unit 25, at least one light emitting element 27, e.g. a light emitting diode, and a photosensitive element 29 are integrated. The light emitting element 27 produces the energy E and the data D as light signal and couples this light signal for transmission to the sensor unit 4 into the light waveguide 24. The optical energy E of the light signal is converted in the second optical transmitting/receiving unit 26 of the sensor unit 4, for example, through a photovoltaic element 28, back into electrical energy. The sensor unit 4 is supplied via this reconverted energy of the photovoltaic element 28. The second optical transmitting/receiving unit 26 contains for transmission of the conditioned output signal OS a light emitting element 27, which couples the conditioned output signal OS in the form of a light signal into the light waveguide. Thus, the other pressure-sensor 2 for measuring the headspace pressure via the light waveguide 24 and through the conversion of the electrical signal into an optical signal is galvanically isolated from the remaining measurement transmitter 23. The two sensor units 4 transmit the first measured variable M1 and the second measured variable M2 simultaneously or offset in time to the application specific, evaluating unit 5. If the measured variables M1, M2 are sent simultaneously to the application specific, evaluating unit 5, then, before the signal evaluation, a difference forming of the two measured variables M1, M2 is provided. On the other hand, in the case of a transmission of the measured variables M1, M2 offset in time through the conditioned output signal OS, the difference forming is done after the signal evaluation by the application specific, evaluating unit 5.

The example of an embodiment in FIG. 10 shows a second variant of the apparatus 1 for ascertaining the hydrostatic pressure difference, wherein a measurement transmitter 23 of the invention with a pressure-sensor 2 is placed on the container 31 below the position of the smallest fill level F. According to the invention, its modularly embodied, measuring transducer circuit 3 is composed of a sensor unit 4 and an application specific, evaluation unit 5, which communicate in galvanic isolation via an optical light waveguide 24. In order to ascertain the headspace pressure, i.e. the pressure of the gas phase in the container 31, a further pressure-sensor 2 is placed above the maximal fill level F and communicates with the application specific, evaluation unit 5 by means of the associated sensor unit 4 via an additional light waveguide 24. For transmission of the conditioned output signal OS and the energy E via the light waveguide 24, there are provided in the two sensor units 4 corresponding second optical transmitter/receiver units 26, as well as at least a first optical transmitter/receiver unit 25 in the application specific, evaluation unit 5.

The optical transmitter/receiver units 26 is, for example, so embodied, that each channel, or each connected sensor 2, has its own photosensitive element 28. For example, for energy supply of the sensor units 4 in the application specific, evaluation unit 5, only a laser diode 27 is provided. The signal isolation of the individual channels occurs, for example, through signal coding, optical multiplex method, refraction into different spectral ranges or a spatial, or optical isolation. It is also an option to provide optical pressure sensors, such as e.g. described in DE 100 556 29 A1, DE 102005016641 A1, EP 1 008 840 A1 and DE 40 18 998 A1. These optical pressure sensors have the advantage, that they require no additional energy supply for the sensor unit 4, but, instead, most often, operate based on the measuring of the changing of an optical property of the light waveguide 24 or an element, e.g. a double-refracting crystal, on the end of the light waveguide 24, based on a pressure change.

The invention claimed is:

1. An apparatus for process control comprising:
at least one sensor for registering at least one chemical and/or physical, process variable;
at least one modularly constructed, measuring transducer circuit, which includes at least one sensor unit, which ascertains from the process variable registered by said sensor an electrical, measured variable and supplies said sensor with energy, and at least one application specific, signal processing unit for ascertaining a measured value from the electrical, measured variable; and
a control/evaluation unit connected to said at least one application, signal processing unit, which is provided for evaluating and further processing of the measured value, as well as for control of the apparatus; wherein:
transmission of a conditioned output signal between said at least one sensor unit and said at least one application specific, signal processing unit is provided;
said at least one application specific, signal processing unit is exchangeably embodied;
as a function of a predeterminable accuracy of measurement of the measured value, at least one of a plurality of different types of application specific, signal processing units is installable;
at least one plug-in location in said measuring transducer circuit for modular exchanging of the different types of said at least one application specific, signal processing unit; wherein:
a first type of said at least one application specific, signal processing unit is provided for applications having a low requirement for accuracy of measurement;
said first type of said at least one appplication specific, signal processing unit includes at least one lowpass circuit;
a second type of said at least one application specific, signal processing unit is provided for applications having an average requirement for accuracy of measurement;
a third type of said at least one application specific, signal processing unit is provided for applications having a high requirement for accuracy of measurement; and
said third type of said at least one application specific, signal processing unit includes at least one analog/digital converter circuit.

2. The apparatus as claimed in claim 1, wherein:
said lowpass circuit provides a measured value in the form of an analog electrical current signal or an analog voltage signal proportional to the electrical, measured variable.

3. The apparatus as claimed in claim 1, wherein:
said second type of said application specific, signal processing unit includes at least one counting circuit.

4. The apparatus as claimed in claim 3, further comprising:
an analog/digital converter circuit, wherein:
said counting circuit and/or said analog/digital converter circuit provide(s) a measured value in the form of a digital signal proportional to the electrical, measured variable.

5. The apparatus as claimed in claim 1, wherein:
said at least the first type, a second type and/or a third type of said application specific, signal processing unit is integrated fixedly in said measuring transducer circuit.

6. The apparatus as claimed in claim 1, further comprising:
a switch element is provided at said plug-in location.

7. The apparatus as claimed in claim 1, further comprising:
a review unit is provided, which enables a plausibility review or validation of the measured values ascertained by said first type, second type or third type of said application specific, signal processing unit provided in said at least one plug-in location with the measured values ascertained by said first type, second type or third type of said application specific, signal processing unit integrated fixedly in said measuring transducer circuit.

8. The apparatus as claimed in claim 1, further comprising:
at least one hardwired connection for transmission of the uniformly modulated output signal between said sensor unit and said application specific, signal processing unit.

9. The apparatus as claimed in claim 8, further comprising:
at least one isolating element for galvanic isolation of said hardwired connection.

10. The apparatus as claimed in claim 1, further comprising:
for transmission of energy, data and the uniformly modulated output signal between said uniform sensor unit and said application specific, signal processing unit.

11. The apparatus as claimed in claim 1, further comprising:
at least one light waveguide for transmission of energy, data and the uniformly modulated output signal between said uniform sensor unit and said application specific, signal processing unit.

12. The apparatus as claimed in claim 1, further comprising:
a shared clocking line or a preamble in the uniformly modulated output signal for synchronization of said application specific, signal processing unit and said sensor unit.

13. The apparatus as claimed in claim 1, wherein:
setting parameters are stored in said sensor unit for supplying different types of sensors and/or for producing the electrical, measured variable of different types of sensors.

14. The apparatus as claimed in claim 1, further comprising:
an automation routine in said sensor unit for adjusting setting parameters corresponding to ascertained type of connected sensor.

15. The apparatus as claimed in claim 1, further comprising:
a parametering unit, which transmits to said sensor unit data at least for adjusting the setting parameters and/or data for adjusting conditioning of the uniformly conditioned output signal.

16. The apparatus as claimed in claim 1, wherein:
a pulse width modulated signal is provided as uniformly conditioned output signal.

17. The apparatus as claimed in claim 1, wherein:
a frequency modulated signal is provided as uniformly conditioned output signal.

18. The apparatus as claimed in claim 1, wherein:
a pulse phase modulated signal is provided as uniformly conditioned output signal.

19. The apparatus as claimed in claim 1, wherein:
said sensors are embodied as NTC thermistor, PTC thermistor, semiconductor temperature sensor, thermocouple, pyroelectric temperature sensor, Curie effect, temperature sensor and/or fiber optical, temperature sensor for ascertaining a temperature as the electrical, measured variable of the process variable.

20. The apparatus as claimed in claim 1, wherein:
sensors, which, according to a capacitive or piezoresistive, optical or fiber optical principle of action, convert the process variable, pressure, into a proportional electrical, measured variable, for ascertaining pressure as electrical, measured variable of the process variable.

21. The apparatus as claimed in claim 1, wherein:
sensors, which work according to a capacitive, conductive, piezoelectric measuring principle or travel time, measuring principle, are provided for ascertaining a fill level or a limit level in a container as electrical, measured variable the process variable.

22. The apparatus as claimed in claim 1, wherein:
sensors, which work according to a magneto-inductive measuring principle, Coriolis, vortex counting, travel time, measuring principle or according to the Venturi, orifice plate or stagnation pressure probe principle, are provided for ascertaining flow as electrical, measured variable of the process variable.

* * * * *